United States Patent [19]
Kinser

[11] 3,755,120
[45] Aug. 28, 1973

[54] INTERNAL COMBUSTION ENGINE EXHAUST CATALYTIC REACTOR, WITH ELECTRICAL CHARGE MEANS

[75] Inventor: Robert W. Kinser, Ogden, Utah
[73] Assignee: New Products Corporation, Ogden, Utah
[22] Filed: Feb. 3, 1972
[21] Appl. No.: 222,755

[52] U.S. Cl. .................. 204/164, 60/275, 204/165, 204/323, 204/328
[51] Int. Cl. ........................... F01n 7/00, F01n 3/08
[58] Field of Search ..................... 60/275; 204/164, 204/165, 323, 328

[56] References Cited
UNITED STATES PATENTS
3,157,479  11/1964  Boles ................................. 60/275
3,526,081  9/1970   Kusters ............................. 204/323
3,537,965  11/1970  Keckler et al. .................... 204/323
3,562,127  2/1971   Wooton et al. .................... 204/164

FOREIGN PATENTS OR APPLICATIONS
411,807    9/1932   Great Britain .................... 204/323
1,140,424  7/1957   France ............................. 204/323

Primary Examiner—F. C. Edmundson
Attorney—H. Calvin White, William W. Haefliger et al.

[57] ABSTRACT

Internal combustion engine hot exhaust gas flow is treated to reduce the oxide content and increase the $O_2$ content of the gases by
  a. effecting intimate contact of the hot gaseous flow with confined copper containing strip material, and
  b. electrically energizing the material at high voltage during said contact.

11 Claims, 5 Drawing Figures

Patented Aug. 28, 1973
3,755,120
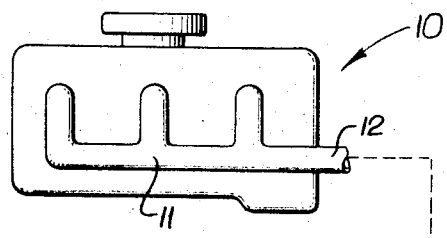
Fig. 1.
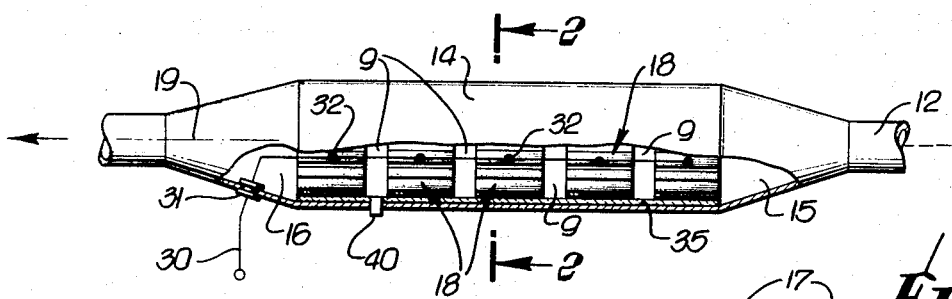
Fig. 3.
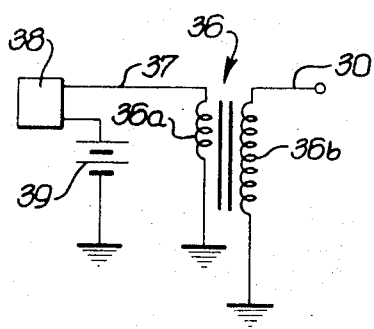
Fig. 2.
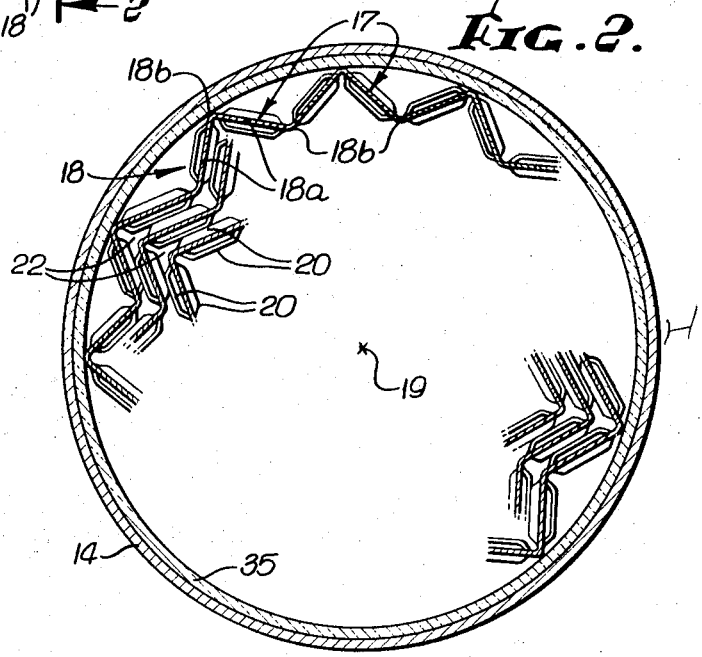
Fig. 4.
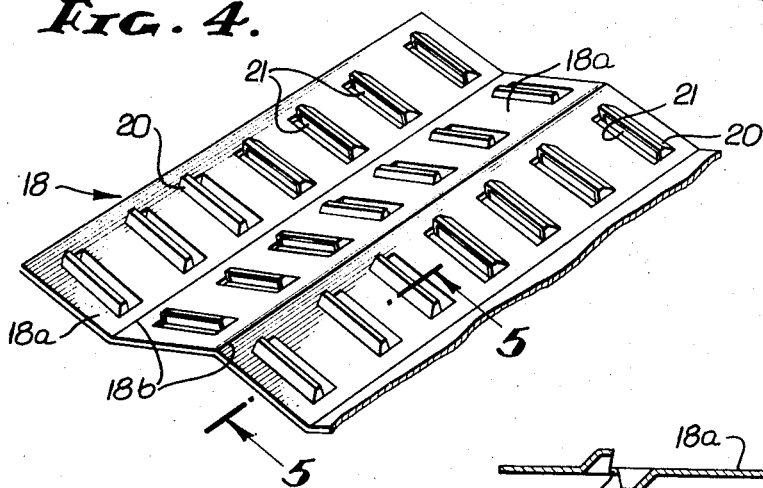
Fig. 5.
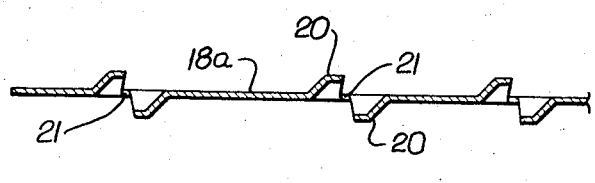

INTERNAL COMBUSTION ENGINE EXHAUST CATALYTIC REACTOR, WITH ELECTRICAL CHARGE MEANS

BACKGROUND OF THE INVENTION

This invention relates generally to air pollution reduction, and more particularly concerns improvements in internal combustion engine exhaust treatment in catalytic reactors.

In the past, catalytic reactors have suffered from deficiencies such as excessive complexity, the creation of unacceptable back pressure, and failure to remove pollutants to the extent sought or desired in accordance with present day standards. The content of that certain Dillian P. Ashburn application for U.S. letters Pat. Ser. No. 114,175 represents a substantial effort to overcome these problems. A further problem concerns the removal of hydrocarbons and oxides of nitrogen emissions, which tend to increase at higher operating temperature in a catalytic reactor of Ashburn type.

SUMMARY OF THE INVENTION

It is a major object of the invention to provide an improved catalytic reactor of the type disclosed in the above Ashburn application, and characterized in its operation by substantial reduction of carbon monoxide hydrocarbon and oxides of nitrogen emissions.

Basically, the improved reactor comprises a casing connectible in series with internal combustion engine exhaust ducting and having entrance and exit parts; metallic fin packing extending in the casing to form multiple flow passages for the exhaust, the packing characterized as acting, when heated and contacted by the exhaust, as reducing the oxide content thereof thereby to increase the oxygen content in the discharge; and means to supply high voltage electrical current to the fin packing which is electrically conductive, so that reduction of the three pollutants in that discharge is enhanced. As will be seen, the high voltage supply means may include a source of D.C. pulsating voltage, as for example an auxiliary coil in a vehicle ignition system.

Further objects and advantages include the packing in the form of copper or copper alloy strips wound in spirals to which an electrical lead may be connected; the provision of multiple strips as defined, each connected to electrical lead means and the provision of the method to treat the exhaust gases, and employing high voltage application to the strips, as will be seen.

These and other objects and advantages of the invention, as well as the details of an illustrative embodiment, will be more fully understood from the following description and drawings, in which:

DRAWING DESCRIPTION

FIG. 1 is an elevation showing a reactor connected with an engine exhaust;

FIG. 2 is an enlarged section taken on line 2—2 of FIG. 1;

FIG. 3 is a wiring diagram;

FIG. 4 is a perspective showing of a portion of the catalytic reactor strip; and FIG. 5 is a section taken on line 5—5 of FIG. 4.

DETAILED DESCRIPTION

In FIG. 1, an internal combustion engine 10, of Otto, Diesel or other cycle, has an exhaust manifold 11 connected with a tail pipe 12. Connected in series with the latter is a catalytic reactor 13 comprising a longitudinally elongated generally tubular case 14 having lengthwise spaced entrance and exit ports 15 and 16.

Contained within the tubular case are multiple metallic fins extending longitudinally in closely packed relation to form multiple flow passages for the engine exhaust, the passages being spaced apart transversely of the case interior. For example, the fins may be defined as corrugations 17 on multiple metallic strips 18 each wound in a spiral about an axis 19 extending longitudinally in the case. The strips may be spaced end to end in multiple sections, as shown, to allow the gases to mix in plenum spaces or chambers 9 between the strips. Typically, there are tabs 20 on and struck out from each strip to project therefrom and act as spacers for maintaining the spiral windings closely spaced apart. Further, the striking of the tabs from the strip forms openings 21 communicating between the longitudinal passages 22 between such windings, so that hot exhaust gases may not only flow lengthwise in intimate contact with the windings, but may also be deflected by the tabs and through the openings to impinge against the strip winding surfaces. In this way, maximum contacting and scrubbing of the dispersed gases against the thin windings is achieved, for catalytic reaction.

Note that the corrugations may have saw-tooth configuration in FIG. 2 cross section as defined by flat portions 18a and folds 18b; further the thickness of the strip may with unusual advantage between 0.004 and 0.007 inch; the crest to crest dimensions of the saw tooth corrugations may lie between ¼ and ¾ inch; the gap between adjacent windings may be about 1/16 to 3/16 inch; and the crest to trough dimensions of the saw tooth corrugations may lie between ¼ and ½ inch.

The fin or strip metal consists of a catalyst which, when contacted by the hot exhaust gases, reduces the oxide content of the latter thereby to increase the oxygen content in the exhaust discharge from the exit port 16. Typically, the fin metal consists essentially of copper, as for example pure copper which when contacted by the hot exhaust gases produces the reactions with respect to $CO_2$, $CO$, $NO_2$ and $NO$, as described in said Ashburn application, to form $O_2$, $C$, $N_2$, and $H_2O$.

As mentioned in the introduction, it is found that when the temperatures of the exhaust gases entering the reactor are above about 650° F, excessive carbon monoxide will be produced, hydrocarbons will not be condensed, and the life of the catalyst will be substantially decreased by chemical action and structural ablation. This problem is overcome in accordance with the invention by providing means to supply high voltage electrical current to the fin packing, which is electrically conductive.

In the illustrated example, such high voltage current is supplied via a lead 30 extending from the reactor exterior through insulator 31 to the reactor interior. The lead, which may be suitably insulated, is welded at the spaced locations 32 shown, spaced inwardly of the casing, to the fin packing strips or rolls 18, so that the current flows in each roll. An electrical insulator sleeve indicated at 35, as for example asbestos, glass fibers, aluminum oxide, high temperature polymeric liner material, etc, spaces the packing from the inner wall of metallic casing 14.

FIG. 3 shows a source of such high voltage current as comprising DC pulsating current taken from an auxiliary ignition coil 36 associated with the vehicle ignition system. The coil primary 36a is connected at 37 with the distributor points or voltage supply or interrupter system 38, the vehicle (such as automobile) battery 39 also connected to such supply. The coil secondary 36b is connected with lead 30, as shown.

That substantial reduction of CO emission is achieved is indicated by the following test data, wherein 10KVDC refers to 10,000 volts, DC.

| Test Condition | %$CO_2$ | %$O_2$ | %$N_2$ | %CO |
|---|---|---|---|---|
| Before device, no voltage | 10.13 | 9.51 | 79.78 | .58 |
| After device, no voltage | 7.45 | 12.64 | 79.50 | .40 |
| Before device, with +10KVDC | 10.14 | 9.48 | 79.98 | .41 |
| After device, with +10KVDC | 6.17 | 14.37 | 79.24 | .22 |
| After device, with −10KVDC | 6.35 | 13.91 | 79.55 | .18 |

Further, copper alloy, such as 99 percent copper and 1 percent cobalt, used as the film packing material, also tends to enhance the reduction of CO, and importantly increases the mechanical strength of the catalyst, thereby increasing the catalyst life.

It should also be observed that due to the essentially straight-through construction of the reactor, the back pressure created is very low. Further, it has been found to be similarly workable with both unleaded and leaded gasoline used as fuel for the engine.

Water condensed out of the exhaust gases flowing through the reactor may be drained as for example via a drainage outlet in the case, shown at 40 in FIG. 1. Another method would be to collect the water in a gravity trap which may be periodically drained.

I claim:

1. In a catalytic reactor to be connected in series with internal combustion engine exhaust ducting, the combination comprising
    a. a casing having exhaust entrance and exit ports,
    b. metallic fin packing extending in the casing to form multiple flow passages for said exhaust, the packing when contacted by the hot exhaust gas acting to reduce the oxide content thereof thereby to increase the oxygen content in the exhaust discharge from the exit port, and
    c. means to supply high voltage electrical current to said fin packing, the packing being electrically conductive.
2. The combination of claim 1 wherein said high voltage supply means includes a source of pulsating D.C. voltage.
3. The combination of claim 2 wherein said packing comprises a corrugated copper strip extending about an axis extending longitudinally in the case between said ports.
4. The combination of claim 1 wherein said high voltage supply means comprises an induction coil winding associated with a vehicle ignition system.
5. The combination of claim 1 wherein said metallic fin packing consists essentially of copper.
6. The combination of claim 1 wherein said metallic fin packing consists of an alloy of copper and cobalt.
7. The combination of claim 1 wherein the fins are defined by a corrugated metallic strip wound in a spiral about an axis extending longitudinally in the casing so that the corrugations extend longitudinally therein, said high voltage current supply means including an electrical lead extending in the casing and electrically connected with the spiral strip, and wherein the spiral strip is electrical insulated from the casing.
8. The combination of claim 1 wherein the fins are defined by metallic strips wound in spirals about an axis extending longitudinally in the casing, said spiral strips spaced apart in the direction of said axis, and said current supply means including electrical lead means extending in the casing and electrically connected with the spiral strip, the casing being metallic and there being an electrical insualtor spacing the strips from the casing.
9. The method of treating internal combustion engine hot exhaust gas flow to reduce the oxide content thereof and increase the $O_2$ content of the gases, that includes
    a. effecting intimate contact of the hot gaseous flow with confined copper containing fins forming exhaust passages, and
    b. electrically energizing the fins at high voltage during said contact.
10. The method of claim 9 wherein said high voltage is positive.
11. The method of claim 9 wherein said high voltage is negative.

* * * * *